(12) United States Patent
Cai et al.

(10) Patent No.: US 8,638,740 B2
(45) Date of Patent: *Jan. 28, 2014

(54) MULTIMEDIA BROADCAST MULTICAST SERVICE CHANNEL MAPPING AND MULTIPLEXING

(75) Inventors: Zhijun Cai, Euless, TX (US); James Earl Womack, Bedford, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 148 days.

This patent is subject to a terminal disclaimer.

(21) Appl. No.: 13/186,171

(22) Filed: Jul. 19, 2011

(65) Prior Publication Data

US 2011/0274027 A1     Nov. 10, 2011

Related U.S. Application Data

(63) Continuation of application No. 11/954,162, filed on Dec. 11, 2007, now Pat. No. 8,000,292.

(60) Provisional application No. 60/971,966, filed on Sep. 13, 2007.

(51) Int. Cl.
*H04W 4/00*     (2009.01)
*H04H 20/71*     (2008.01)

(52) U.S. Cl.
USPC ............................ 370/329; 370/312; 370/328

(58) Field of Classification Search
USPC ......... 370/312, 328–329, 335–336, 342–343, 370/345, 348, 400–401, 432, 436–437, 370/441–443, 465, 479–480
See application file for complete search history.

(56) References Cited

U.S. PATENT DOCUMENTS

| | | | |
|---|---|---|---|
| 8,279,791 B2 * | 10/2012 | Ma et al. ........................ | 370/312 |
| 2004/0117860 A1 | 6/2004 | Yi et al. | |
| 2008/0101270 A1 | 5/2008 | Kekki et al. | |
| 2009/0061914 A1 * | 3/2009 | Cai ................................ | 455/466 |
| 2009/0147717 A1 * | 6/2009 | Cai ................................ | 370/312 |
| 2009/0323574 A1 | 12/2009 | Koskinen et al. | |
| 2010/0056166 A1 * | 3/2010 | Tenny ........................... | 455/450 |
| 2010/0128646 A1 * | 5/2010 | Gao .............................. | 370/312 |
| 2010/0178895 A1 * | 7/2010 | Maeda et al. ............... | 455/404.1 |
| 2010/0189026 A1 * | 7/2010 | Lee et al. ...................... | 370/312 |
| 2010/0214972 A1 * | 8/2010 | Che et al. ...................... | 370/315 |
| 2010/0309835 A1 * | 12/2010 | Kuo .............................. | 370/312 |
| 2010/0322135 A1 * | 12/2010 | Van Lieshout et al. ....... | 370/312 |
| 2011/0013554 A1 * | 1/2011 | Koskinen ..................... | 370/315 |
| 2012/0300689 A1 * | 11/2012 | Lee et al. ...................... | 370/312 |

OTHER PUBLICATIONS

Cai, Zhijun, et al.; U.S. Appl. No. 11/954,162, filed Dec. 7, 2007; Title: Multilmedia Broadcast Multicast Service Channel Mapping and Multiplexing.

(Continued)

*Primary Examiner* — Kevin Mew
(74) *Attorney, Agent, or Firm* — Conley Rose, P.C.; Maria L. Sekul; J. Robert Brown, Jr.

(57) ABSTRACT

A system is provided for mapping multimedia broadcast multicast services. The system includes one or more processors programmed to map a plurality of multicast transport channels (MCHs) to a plurality of multicast/broadcast single frequency networks (MBSFNs) such that any one of the MBSFNs has only one MCH and further where each one of the MCHs is different.

14 Claims, 7 Drawing Sheets

(56) References Cited

OTHER PUBLICATIONS

European Examination Report; Application No. 08706222.0; Oct. 6, 2011; 6 pages.
3GPP TS 36.300 V8.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Jun. 2007; 106 pages.
Canadian Office Action; Application No. 2,699,082; Feb. 16, 2012; 3 pages.
European Summons to Attend Oral Proceedings Pursuant to Rule 115(1) EPC; Application No. 08706222.0; Feb. 21, 2012; 4 pages.
3rd Generation Partnership Project; Technical Specification Group Radio Access Network; Title: Evolved Universal Terrestrial Radio Access (E-UTRA) and Evolved Universal Terrestrial Radio Access Network (E-UTRAN); 3GPP TS 36.300 v8.4.0; Mar. 2008; 126 pgs.
3rd Generation Partnership Project; Technical Specification Group Radio Access Network; Title: Evolved Universal Terrestrial Radio Access (E-UTRA) and Evolved Universal Terrestrial Radio Access Network (E-UTRAN) Radio interface protocol aspects; 3GPP TR 25.813 v7.1.0; Sep. 2006; 41 pgs.
3rd Generation Partnership Project; Technical Specification Group Radio Access Network; Title: Physical Layer Aspects for Evolved Universal Terrestrial Radio Access (UTRA); 3GPP TR 25.814 v7.1.0; Sep. 2006; 132 pgs.
Research in Motion Limited; Title: "MBMS Multiplexing"; 3GPP TSG-RAN-WG2 Meeting #59bis; R2-074044; Shanghai, China; Oct. 8-12, 2007; 2 pgs.
3GPP; Title: "Universal Mobile Telecommunications System (UMTS); Evolved Universal Terrestrial Radio Access (E-UTRA and Evolved Universal Terrestrial Radio Access (E-UTRAN)"; Stage 2; ETSI TS 136 300 V8.0.0; Mar. 2007; 84 pgs.
PCT International Search Report; PCT Application No. PCT/CA2008/000074; May 30, 2008; 3 pgs.
PCT Written Opinion of the International Searching Authority; PCT Application No. PCT/CA2008/000074; May 30, 2008; 4 pgs.
Panasonic; 3GPP TSG RAN WG2 #59; Title: "MCCH Structure and Transmission in LTE"; R2-073267; Athens, Greece; Aug. 20-24, 2007; 3 pgs.
LG Electronics; 3GPP TSG-RAN WG2 #59; Title: "Discussion on LTE MBMS Transmission Scenarios"; R2-073357; Athens, Greece; Aug. 20-24, 2007; 6 pgs.
Nokia Siemens Networks, Nokia; 3GPP TSG-RAN WG2 Meeting #59; Title: "MCCH Content and Transmission"; R2-073086; Athens, Greece; Aug. 20-24, 2007; 5 pgs.
ETSI TS 136 300 v8.1.0; Universal Mobile Telecommunications System (UMTS); Evolved Universal Terrestrial Radio Access (E-UTRA) and Evolved Universal Terrestrial Radio Access (E-UTRAN); Overall Description; Stage 2; (3GPP TS 36.300 version 8.1.0 Release 8); Jun. 2007; 108 pgs.
European Search and Examination Report; EP Application No. 08706222.0-2412; Oct. 26, 2010; 8 pgs.
Office Action dated Nov. 15, 2010; U.S. Appl. No. 11/654,162, filed Dec. 11, 2007; 11 pages.
Notice of Allowance dated Apr. 19, 2011; U.S. Appl. No. 11/654,162, filed Dec. 11, 2007; 10 pages.
PCT International Preliminary Report on Patentability; Application No. PCT/CA2008/000074; Dec. 4, 2009; 5 pages.
ETSI TS 136 300 v8.2.0; Universal Mobile Telecommunications System (UMTS); Evolved Universal Terrestrial Radio Access (E-UTRA) and Evolved Universal Terrestrial Radio Access (E-UTRAN); Overall Description; Stage 2; (3GPP TS 36.300 version 8.2.0 Release 8); Oct. 2007; 112 pgs.

\* cited by examiner

MULTIMEDIA BROADCAST MULTICAST SERVICE CHANNEL MAPPING AND MULTIPLEXING

CROSS-REFERENCE TO RELATED APPLICATIONS

The present application is a continuation of U.S. patent application Ser. No. 11/954,162 filed Dec. 11, 2007 by Zhijun Cai, entitled "Multimedia Broadcast Multicast Service Channel Mapping and Multiplexing" which claims benefit of and priority to U.S. Provisional Patent Application No. 60/971,966, filed Sep. 13, 2007, by Zhijun Cai, entitled "Multimedia Broadcast Multicast Service Channel Mapping and Multiplexing", which are incorporated by reference herein as if reproduced in their entirety.

BACKGROUND

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment. For LTE equipment, the region in which a wireless device can gain access to a telecommunications network might be referred to by a name other than "cell", such as "hot spot". As used herein, the term "cell" will be used to refer to any region in which a wireless device can gain access to a telecommunications network, regardless of whether the wireless device is a traditional cellular device, an LTE device, or some other device.

Devices that might be used by users in a telecommunications network can include both mobile terminals, such as mobile telephones, personal digital assistants, handheld computers, portable computers, laptop computers, tablet computers and similar devices, and fixed terminals such as residential gateways, televisions, set-top boxes and the like. Such devices will be referred to herein as user equipment or UE.

A group of LTE-based cells might be under the control of a single entity known as a central control. The central control typically manages and coordinates certain activities with a group of cells such as the scheduling of transmissions and the control of a modulation and coding scheme for the cells. The modulation and coding schemes might include binary phase-shift keying (BPSK), quadrature phase-shift keying (QPSK), quadrature amplitude modulation (QAM), or other schemes that will be familiar to one of skill in the art.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells. A set of cells receiving an MBMS can be referred to as a service area. A service area and a region under the control of a central control do not necessarily coincide. For example, a central control might specify that a first subset of cells under its control will deliver a first MBMS and that a second subset of cells under its control will deliver a second MBMS.

When multiple cells overlap, a UE within the overlapped region can receive transmissions from multiple ENBs. It is well known in the art that when a UE receives substantially identical data from a plurality of ENBs, the transmissions from the ENBs can augment one another to provide a signal of significantly higher quality than would be the case if only one ENB were transmitting the signal. That is, a higher signal-to-noise ratio can be achieved when substantially the same data is transmitted at substantially the same time on substantially the same resource with substantially the same modulation and coding. A region in which a plurality of substantially identical signals are present is known as a single frequency network, or SFN. In the case where all of the ENBs in a service area are transmitting an MBMS with substantially identical signals, the service area can be referred to a multicast/broadcast SFN (MBSFN).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a system is provided for mapping multimedia broadcast multicast services. The system includes one or more processors programmed to map a plurality of multicast transport channels (MCHs) to a plurality of multicast/broadcast single frequency networks (MBSFNs) such that any one of the MBSFNs has only one MCH and further where each one of the MCHs is different.

In another embodiment, a method is provided for mapping multimedia broadcast multicast services. The method includes mapping a plurality of multicast transport channels (MCHs) to a plurality of multicast/broadcast single frequency networks (MBSFNs) such that any one of the MBSFNs has only one MCH and further where each one of the MCHs is different.

Figure 1:
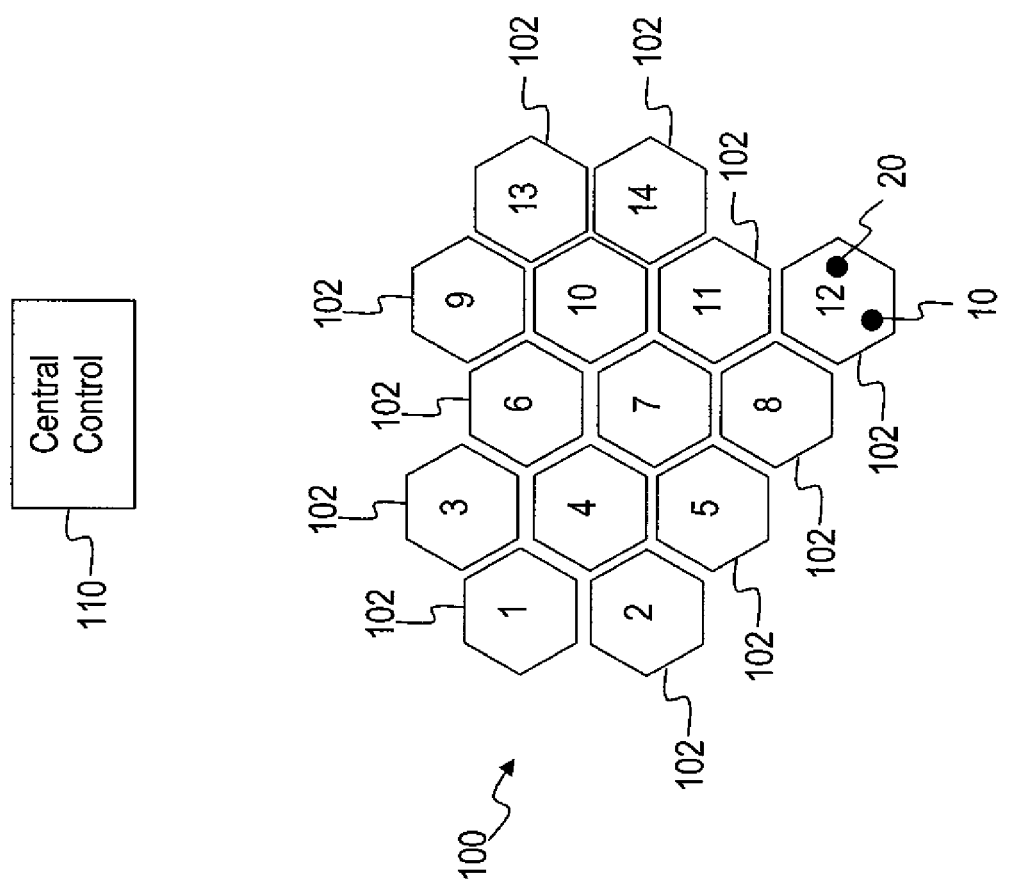
FIG. 1 is an illustration of a cellular network according to an embodiment of the disclosure.

FIG. 1 illustrates an exemplary cellular network 100 according to an embodiment of the disclosure. The cellular network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represents a coverage area for providing cellular services of the cellular network 100 through communication from an enhanced node B (ENB). While the cells 102 are depicted as having non-overlapping coverage areas, persons of ordinary skill in the art will recognize that one or more of the cells 102 may have partially overlapping coverage with adjacent cells. Further, while a particular number of the cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one cell $102_{12}$, it will be apparent to one of skill in the art that a plurality of UEs 10 might be present in each of the cells 102. An ENB 20 in each of the cells 102 performs functions similar to those of a traditional base station. That is, the ENBs 20 provide a radio link between the UEs 10 and other components in a telecommunications network. While the ENB 20 is shown only in cell $102_{12}$, it should be understood that an ENB would be present in each of the cells 102. Also, radio links other than the ENBs 20 could be used. A central control 110 oversees the wireless data transmissions within the cells 102 by providing centralized management and coordination for the cells 102 and their corresponding ENBs 20.

Figure 2:
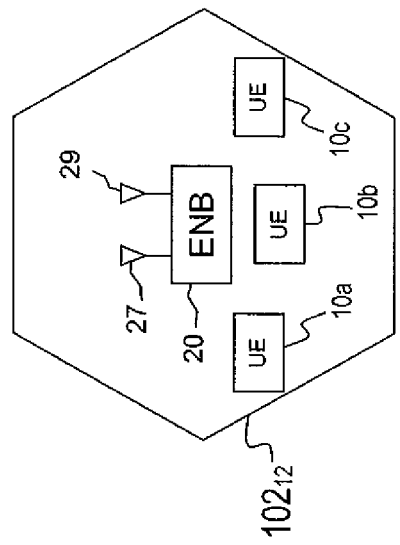
FIG. 2 is an illustration of a cell in a cellular network according to an embodiment of the disclosure.

In the present disclosure, the cellular systems or cells 102 are described as engaged in certain activities, such as transmitting signals; however, as will be readily apparent to one skilled in the art, these activities would in fact be conducted by components comprising the cells. As an example, FIG. 2 depicts a more detailed view of the cell $102_{12}$. The ENB 20 in cell $102_{12}$ can promote communication via a transmitter 27, a receiver 29, and/or other well known equipment. Similar equipment might be present in the other cells 102. A plurality of UEs 10 are present in the cell $102_{12}$, as might be the case in the other cells 102.

The transmission of an MBMS in one or more of the cells 102 can include two components, a multicast control channel (MCCH) and a multicast traffic channel (MTCH). The MTCH delivers the actual content of the MBMS while the MCCH delivers control information related to the MBMS. The MCCH might include key control information that specifies how the content in the MTCH is to be delivered. Configuration information for the MCCH might be transmitted in a broadcast control channel (BCCH). Each of the cells 102 might transmit information over a BCCH to provide the UEs 10 with information about the MBMSs available in the cells 102 and with other information. When one of the UEs 10 powers up, it can receive the BCCH, read the MCCH configuration contained in the BCCH, and determine from the MCCH control information how to receive one or more MTCHs.

In an embodiment, the MCCH control information is divided into two portions: master control information and service control information. The master control information can also be referred to as primary MCCH (P-MCCH) information and the service control information can also be referred to as secondary MCCH (S-MCCH) information. The S-MCCH information can include information about how an MTCH can be received. The P-MCCH information can directly include the S-MCCH information or can include a pointer to a location where the S-MCCH information can be retrieved.

In an embodiment, the S-MCCH information includes control information for one or more MTCH transmissions. This might include scheduling information for one or more MTCHs, modulation and coding information for one or more MTCHs, and SFN-related parameters such as a blocked cell list. Since multiple MTCHs might be transmitted by a single ENB 20, and a different set of S-MCCH information might be needed for each MTCH, multiple sets of S-MCCH information might be associated with the BCCH transmitted by the single ENB 20.

In various embodiments, the P-MCCH information contains or points to scheduling information for the S-MCCH information. That is, the P-MCCH information specifies when and where the S-MCCH information is available. The UEs 10 can then use the scheduling information in the S-MCCH information to receive one or more MTCHs. A single set of P-MCCH information might be associated with multiple sets of S-MCCH information.

Figure 3:
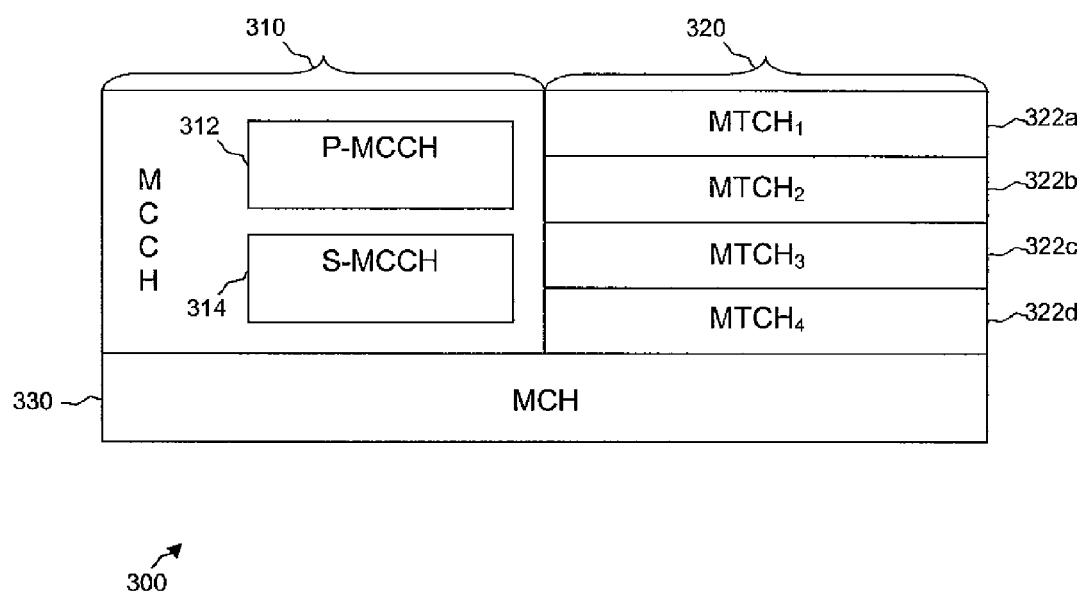
FIG. 3 is a diagram of a structure for a multimedia broadcast multicast service transmission operable for some of the various embodiments of the disclosure.

As is well known in the art, the MTCH and the MCCH are logical, upper layer channels. The lower layer transport channel on which the MTCH and the MCCH are carried is typically referred to as the MBMS multicast channel, the multicast transport channel, or simply the MCH. FIG. 3 illustrates an embodiment of a structure of an MBMS transmission 300. The transmission 300 includes an MCCH portion 310 and an MTCH portion 320. The MCCH 310 and the MTCH 320 are transported on an MCH layer 330. The MCCH 310 includes a P-MCCH portion 312 and an S-MCCH portion 314. The MTCH portion 320 includes a plurality of individual MTCHs 322, each corresponding to a different MBMS. While four MTCHs 322 are shown, in other embodiments, a larger or smaller number of MTCHs 322 could be present. Also, while the MCCH portion 310 and the MTCH portion 320 are shown being carried on the same MCH layer 330, in some cases, the MCCH portion 310 and the MTCH portion 320 could be carried on different MCHs.

Figure 4:
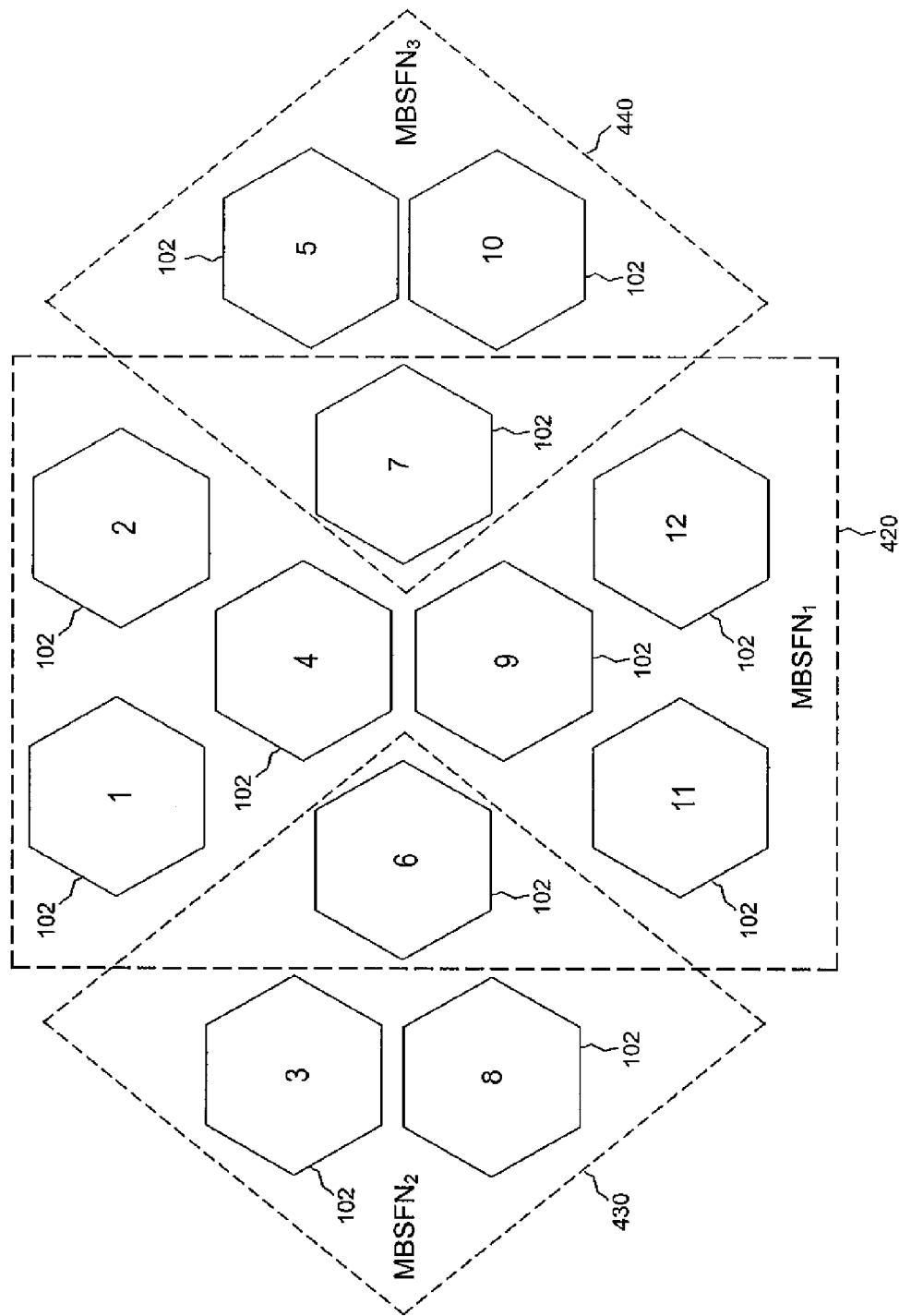
FIG. 4 is a diagram of a plurality of multicast/broadcast single frequency networks operable for some of the various embodiments of the disclosure.

FIG. 4 illustrates a plurality of MBSFNs in which a broadcast and/or multicast of a plurality of MBMS transmissions, such as the MBMS transmission 300, might occur. A first MBSFN 420 includes cells $102_1$, $102_2$, $102_4$, $102_6$, $102_7$, $102_9$, $102_{11}$, and $102_{12}$. A second MBSFN 430 includes cells $102_3$, $102_6$, and $102_8$. A third MBSFN 440 includes cells $102_5$, $102_7$, and $102_{10}$. That is, a broadcast and/or multicast of a first MBMS can be assumed to be occurring in the first MBSFN 420, a broadcast and/or multicast of a second MBMS can be assumed to be occurring in the second MBSFN 430, and a broadcast and/or multicast of a third MBMS can be assumed to be occurring in the third MBSFN 440.

Cell $102_6$ belongs to both the first MBSFN 420 and the second MBSFN 430, and therefore broadcasts and/or multicasts of both the first and the second MBMS can be assumed to be occurring in cell $102_6$. Cell $102_7$ belongs to both the first MBSFN 420 and the third MBSFN 440, and therefore broadcasts and/or multicasts of both the first and the third MBMS can be assumed to be occurring in cell $102_7$. Broadcasts and/or multicasts of other MBMSs could be occurring in the cells 102, and therefore other MBSFNs could be present but are not shown.

In an embodiment, a one-to-one mapping is implemented between an MBSFN and an MCH. That is, each MBSFN uses exactly one MCH, and, in a region where multiple MBSFNs are present, different MBSFNs use different MCHs. In the case where multiple MTCHs (that is, multiple services) are multiplexed in the same MBSFN, the MTCHs can map to the same MCH. Also, in the case where the S-MCCH and one or more MTCHs are being transmitted in the same MBSFN, the S-MCCH and the MTCHs can map to the same MCH.

In the embodiment of FIG. 4, a first MCH would be used in the first MBSFN 420 and only in the first MBSFN 420, a second MCH would be used in the second MBSFN 430 and only in the second MBSFN 430, and a third MCH would be used in the third MBSFN 440 and only in the third MBSFN 440. If multiple MTCHs were being transmitted in a single MBSFN, all of the MTCHs could map to a single MCH. For example, if multiple MTCHs were being transmitted in the first MBSFN 420, all of those MTCHs could map to the first MCH.

Since cell $102_6$ broadcasts and/or multicasts both the first MBMS and the second MBMS, cell $102_6$ broadcasts and/or multicasts both the first MCH in the first MBSFN 420 and the second MCH in the second MBSFN 430. Similarly, cell $102_7$ broadcasts and/or multicasts both the first MBMS and the third MBMS, so cell $102_7$ broadcasts and/or multicasts both the first MCH in the first MBSFN 420 and the third MCH in the third MBSFN 440.

The P-MCCH typically contains cell-specific information such as a count of the number of users in one of the cells 102 interested in a particular service. Also, the P-MCCH might be different for different cells 102 since the cells 102 might be transmitting different services. Since different cells 102 typically have different P-MCCHs, P-MCCHs typically cannot be mapped to a single MCH that is transmitted to different cells 102. Instead, a P-MCCH might be mapped to a cell-specific MCH that is different from the MCH that carries the MTCHs that might be associated with the P-MCCH.

In an alternative embodiment, a P-MCCH can be mapped to a downlink shared channel (DL-SCH) rather than to a cell-specific MCH. The DL-SCH is a cell-specific channel that can carry unicast traffic and can have a better spectrum efficiency than the MCH.

In some cases, the P-MCCH might not be a separate entity as shown in FIG. 3. Instead, the information that would otherwise be carried in the P-MCCH might be included directly in the BCCH. Alternatively, the BCCH might include a pointer to the location of the information that would otherwise be carried in the P-MCCH. For example, if an MBSFN does not overlap with any other MBSFNs and/or if counting of interested users is not needed, the BCCH might directly include or might point to the information that would otherwise be carried in the P-MCCH. The first MBSFN 420 and the second MBSFN 430 as well as the first MBSFN 420 and the third MBSFN 440 are shown overlapping. However in other embodiments, the current disclosure may be applicable where the MBSFNs are adjacent although perhaps not having overlapping cells 102.

Figure 5:
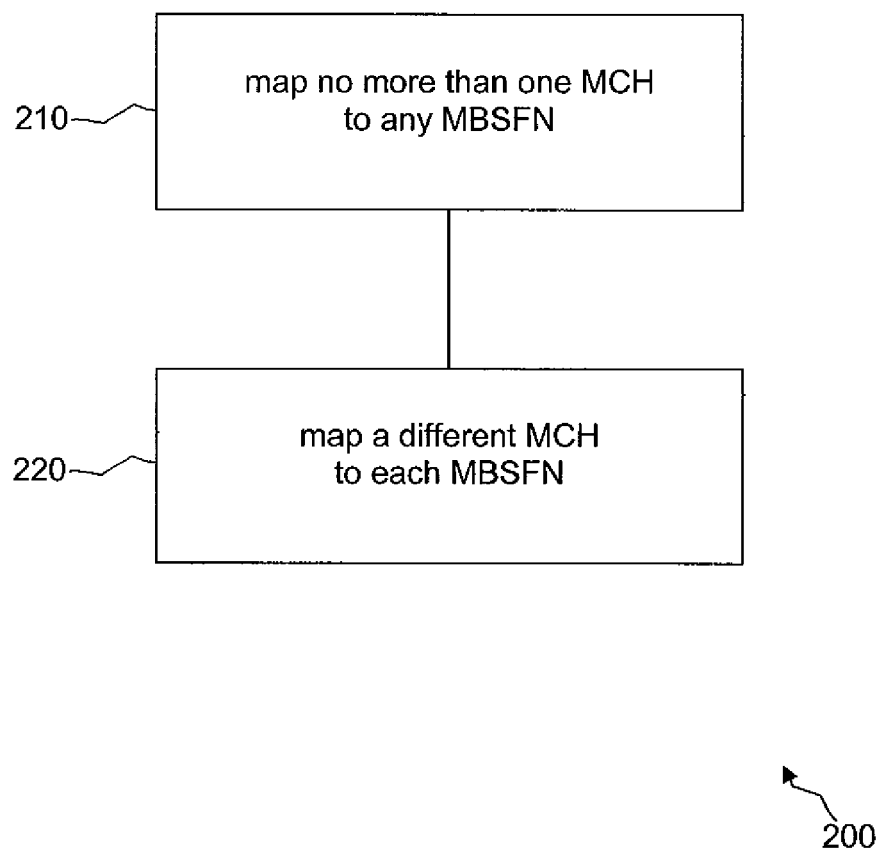
FIG. 5 is a diagram of a method for multimedia broadcast multicast service mapping according to an embodiment of the disclosure.

FIG. 5 illustrates a method 200 for mapping a plurality of MCHs and a plurality of MBSFNs. In block 210, no more than one of the MCHs is mapped to any one of the MBSFNs. In block 220, a different one of the MCHs is mapped to each of the MBSFNs.

Figure 6:
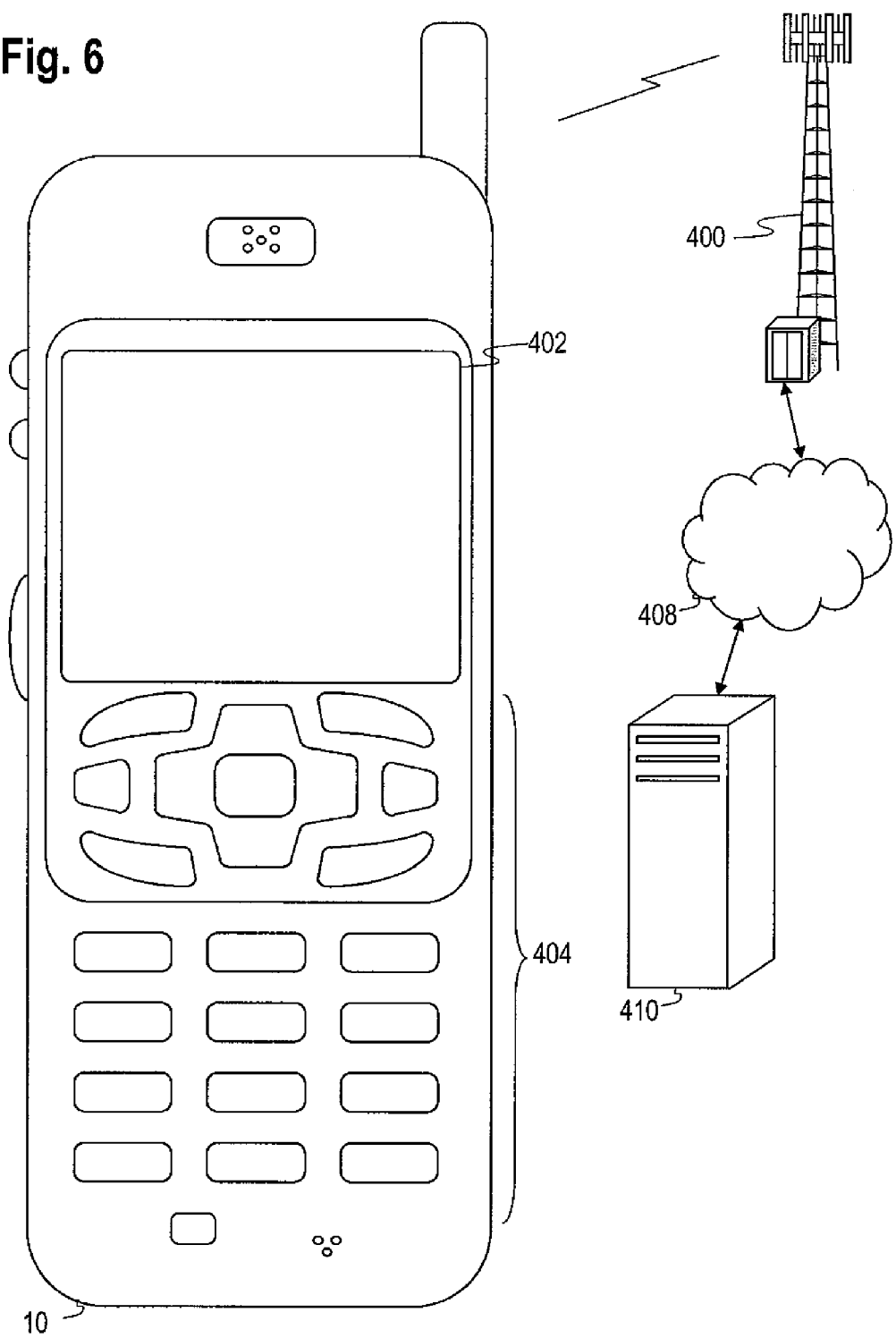
FIG. 6 is a diagram of a wireless communications system including user equipment operable for some of the various embodiments of the disclosure.

FIG. 6 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 7:
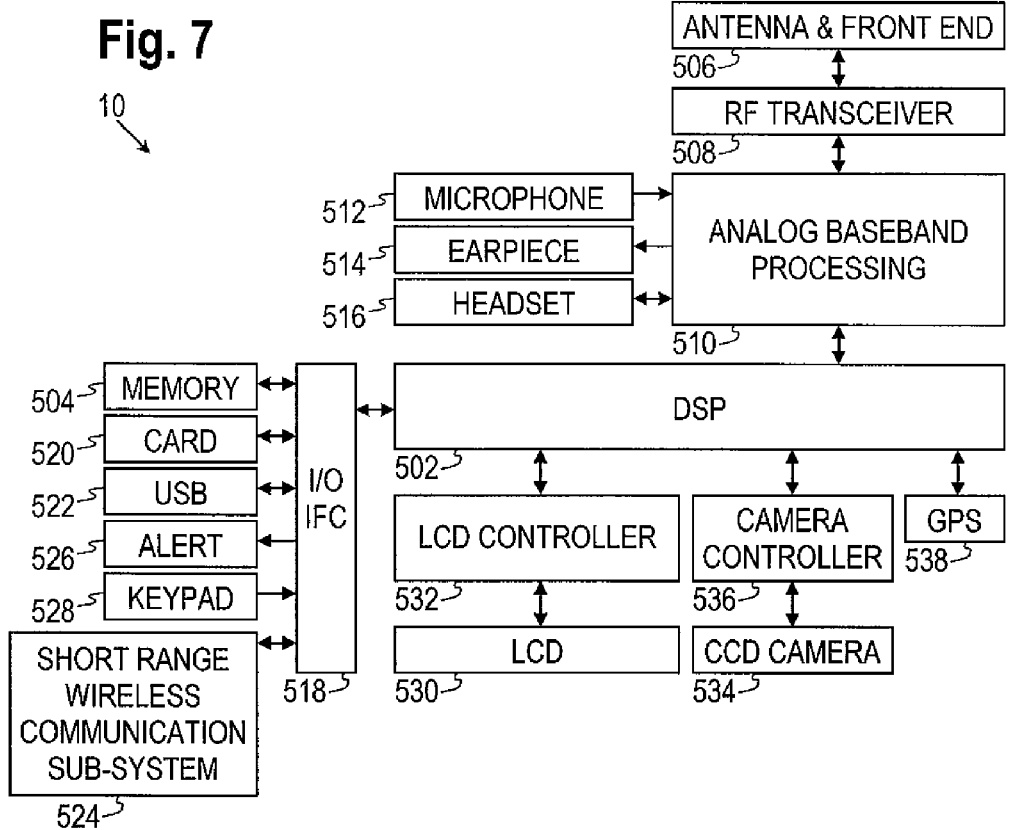
FIG. 7 is a block diagram of user equipment operable for some of the various embodiments of the disclosure.

FIG. 7 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 8:
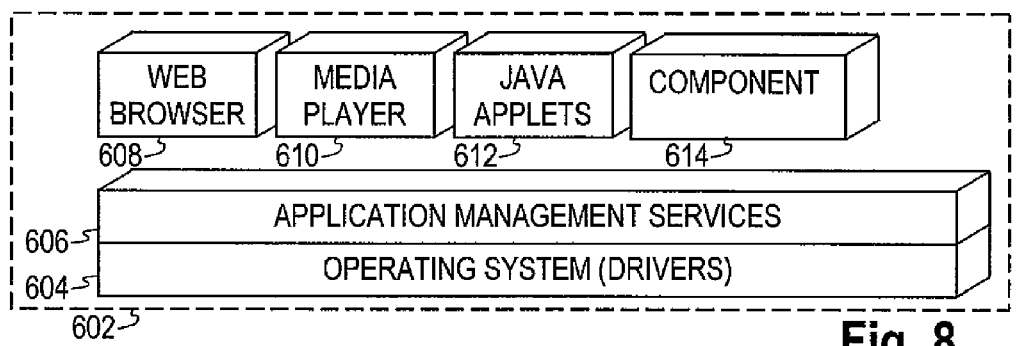
FIG. 8 is a diagram of a software environment that may be implemented on user equipment operable for some of the various embodiments of the disclosure.

FIG. 8 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 8 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to MBMS channel mapping and multiplexing.

Figure 9:
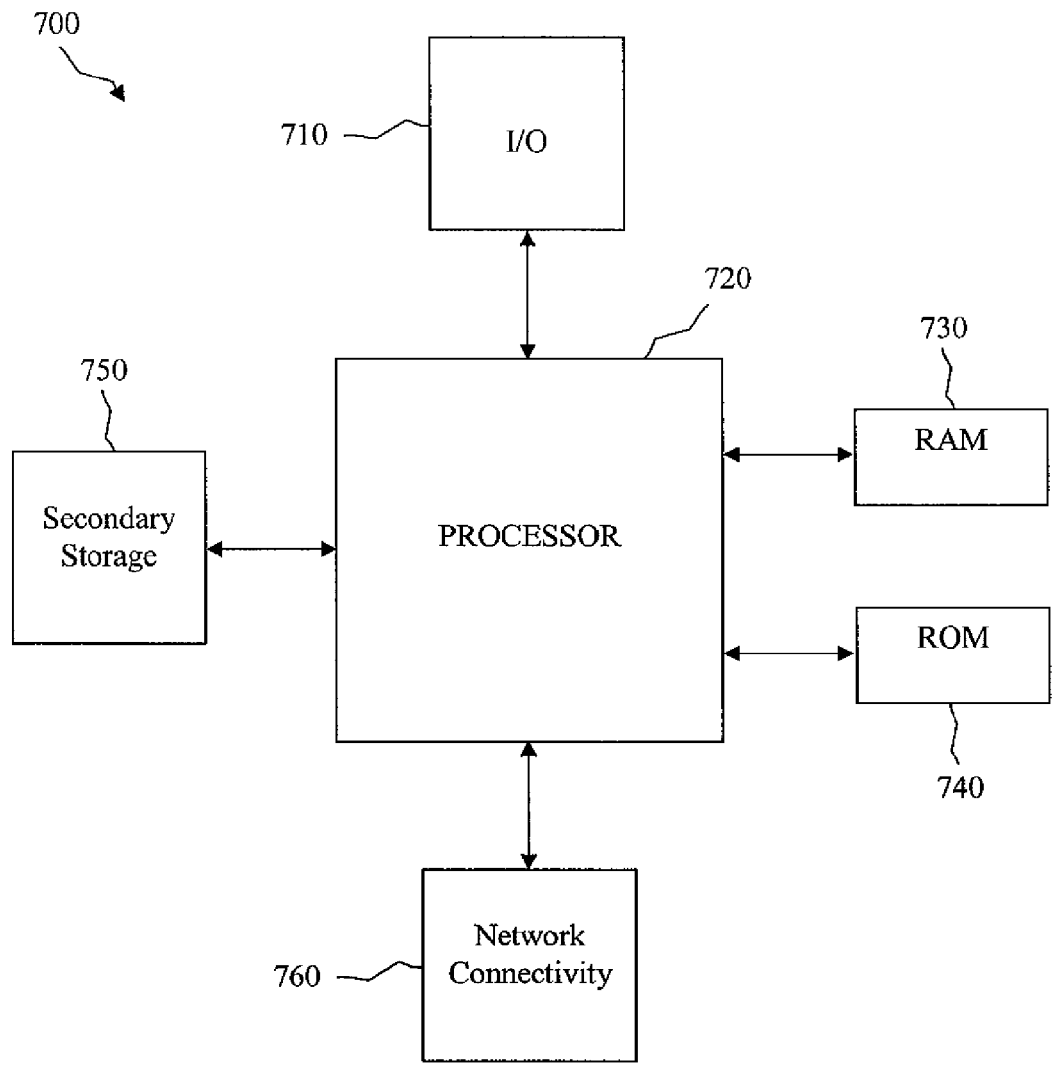
FIG. 9 is an illustrative general purpose computer system suitable for some of the various embodiments of the disclosure.

The UEs 10, ENBs 20, and central control 110 of FIG. 1 and other components that might be associated with the cells 102 may include any general-purpose computer with sufficient processing power, memory resources, and network throughput capability to handle the necessary workload placed upon it. FIG. 9 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method, comprising:
    mapping, by a processor in communication with at least one memory device, one or more multicast transport channels (MCHs) to one or more multicast/broadcast single frequency networks (MBSFNs) such that any one of the MBSFNs has only one MCH and further where each one of the MCHs is different.

2. The method of claim 1, wherein a plurality of multicast traffic channels (MTCHs) associated with a particular one of the MBSFNs is mapped to the one of the MCHs of the particular one of the MBSFNs.

3. The method of claim 2, wherein a multicast control channel (MCCH) portion of a multimedia broadcast multicast service (MBMS) transmission includes a primary MCCH (P-MCCH) portion containing information related to a secondary MCCH (S-MCCH) portion, and the S-MCCH portion containing information related to receiving at least one of the MTCHs, and wherein, when the S-MCCH portion and at least one of the MTCHs are transmitted in the same one of the MBSFNs, the S-MCCH portion and the at least one of the MTCHs are mapped to the same MCH.

4. The method of claim 3, wherein, when information in the P-MCCH portion is specific to a single cell, the P-MCCH portion is mapped to the MCH for the single cell, the MCH for the single cell being different from the MCH to which the S-MCCH portion is mapped.

5. The method of claim 3, wherein, when information in the P-MCCH portion is specific to a single cell, the P-MCCH portion is mapped to a downlink shared channel.

6. The method of claim 3, wherein, when one of the MBSFNs does not overlap with any of the other MBSFNs, and when counting of users interested in the MBMS transmitted in the one of the MBSFNs is not performed, information that would otherwise be carried in the P-MCCH portion is one of:
  included in a broadcast control channel; and
  pointed to by the broadcast control channel.

7. The method of claim 1, wherein at least some of the plurality of the MBSFNs are adjacent to one another.

8. A system, comprising:
  one or more processors in communication with at least one memory device, the one of more processors configured to map one or more multicast transport channels (MCHs) to one or more multicast/broadcast single frequency networks (MBSFNs) such that any one of the MBSFNs has only one MCH and further where each one of the MCHs is different.

9. The system of claim 8, wherein a plurality of multicast traffic channels (MTCHs) associated with one of the MBSFNs is mapped to the one of the MCHs that is mapped to the one of the MBSFNs.

10. The system of claim 9, wherein a multicast control channel (MCCH) portion of a multimedia broadcast multicast service (MBMS) transmission includes a primary MCCH (P-MCCH) portion containing information related to a secondary MCCH (S-MCCH) portion, and the S-MCCH portion containing information related to receiving at least one of the MTCHs, and wherein, when the S-MCCH portion and at least one of the MTCHs are transmitted in the same one of the MBSFNs, the S-MCCH portion and the at least one of the MTCHs are mapped to the same MCH.

11. The system of claim 10, wherein, when information in the P-MCCH portion is specific to a single cell, the P-MCCH portion is mapped to a cell-specific channel.

12. The system of claim 11, wherein the cell-specific channel is one of:
  the MCH for the single cell, the MCH for the single cell being different from the MCH to which the S-MCCH portion is mapped; and
  a downlink shared channel.

13. The system of claim 10, wherein, when one of the MBSFNs does not overlap with any of the other MBSFNs, and when counting of users interested in the MBMS transmitted in the one of the MBSFNs is not performed, information that would otherwise be carried in the P-MCCH portion is one of:
  included in a broadcast control channel; and
  pointed to by the broadcast control channel.

14. The system of claim 8, wherein the system is a central control system.

* * * * *